(No Model.)
W. S. KEYES.
NUT LOCK.
No. 386,989. Patented July 31, 1888.
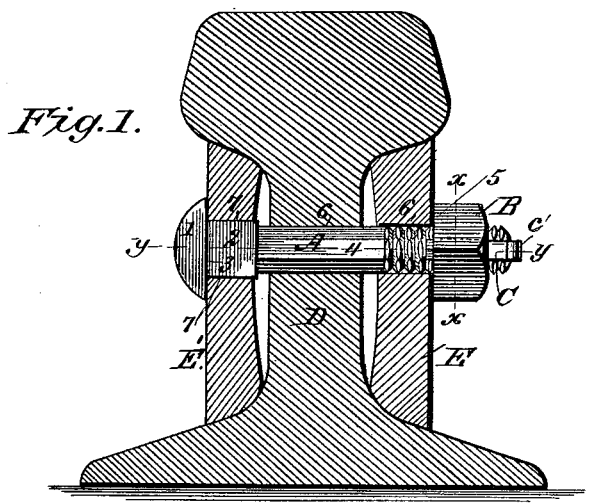
WITNESSES:
Fred G. Dieterich
Leon C. Kernon
INVENTOR:
W. S. Keyes
BY Munn & Co
ATTORNEYS.

UNITED STATES PATENT OFFICE.

WILEY SWEPSON KEYES, OF VERONA, MISSISSIPPI.

NUT-LOCK.

SPECIFICATION forming part of Letters Patent No. 386,989, dated July 31, 1888.

Application filed June 30, 1887. Serial No. 243,024. (No model.)

*To all whom it may concern:*

Be it known that I, WILEY SWEPSON KEYES, of Verona, in the county of Lee and State of Mississippi, have invented a new and useful Improvement in Bolt and Nut Locks, of which the following is a specification.

My invention relates to an improved bolt and nut lock, especially designed for use in connection with railroad-rails and fish-bars; and the improvement consists, in general terms, in a polygonal bolt screw-threaded upon one end to receive the nut and to receive a key which fits in a recess in the nut longitudinally of the bolt to bear upon one of its flattened surfaces, as will hereinafter appear.

In the accompanying drawings, Figure 1 is a side elevation illustrating my invention, with a rail and fish-plates in section; Fig. 2, a section through the bolt and nut in the line $x$-$x$ of Fig. 1. Fig. 3 is a section of the bolt, enlarged, in the line $y$ $y$ of Fig. 1, fitted into its fish-plate and rail; and Fig. 4 is a section on about line 4 4, Fig. 3.

The bolt A is made, preferably, from a square bar of iron headed at 1, and left with a square section, 2, adjacent to the inner flat face, 3, of the head, and is then drawn out or forged into an octagonal section, 4, extending from the square section 2 to the end of the bar. A screw-thread, 5, is then cut upon about one-half the octagonal section 4, of suitable depth to bring the apex of the thread in conjunction with the angles formed by the intersection of the various sides of the bolt, as clearly seen in Fig. 3.

I am aware that bolts have been formed with flattened sides upon the screw-threaded ends, and that keys have been placed between the nuts and the said flattened side to secure the nut to the bolt, and do not broadly claim such device.

The nut B has a channel or recess, $b$, crossing the threads upon its inner surface longitudinally with the axis of the bolt, into which is fitted a slightly wedge-shaped key, C, having a head, C', at its outer end, and which fits flat against one of the sides of the octagonal bolt. The nut is turned upon the bolt until it tightly clamps the fish-plates and rails together and until the key C can be driven into the recess $b$ of the bolt to rest upon one of the flat sides of the bolt. As the bolt is polygonal and its flat sides succeed each other upon the surface of the bolt without intervening spaces, the nut may be keyed by turning it a very slight distance upon the bolt.

The octagonal portion 4 of the bolt will pass through correspondingly-shaped openings, 6, in the rail D and fish-plate E, and will be held thereby from turning, and the square section 2 of the bolt will fit in a squared aperture, 7, in the fish-plate E' of the rail-joint, to give additional hold upon and security to the said bolt, a solid connection being thus established between the bolt, the nut, the rail, and the two fish-plates. By withdrawing the key C from the recess of the nut, the nut may be screwed up or tightened and the key inserted to bear upon another one of the sides of the bolt.

The thread is but slightly impaired because of the flattened sides of the bolt, as such flattened sides succeed each other, as shown in Fig. 2, and leave no short sections of unsupported thin edges, formed by partially mutilating the thread, which may be burred, upset, or caught by the obstructing ends of the thread in the nut to strip the threads of the bolt and permanently damage the same. As the key is driven through the nut longitudinally with the bolt, it will firmly hold the nut and prevent it from turning.

Should the threads be impaired or mutilated in the least, the square slot or key-seat in the nut will act as a die upon the threads each time the nut is removed. Thus an especial advantage is claimed for such key-seat, aside from its use in aiding in locking the nut, which has been before described.

It will be noticed that the portion of the bolt which is threaded has its threads intact or continuous at their base portions, the flat face or faces not extending into the bases of the threads. An important advantage results from such construction, in that thereby I provide a bearing or bearings for the locking-key without diminishing in any material degree the strength of the threads, as it is well known that the strength of threads rests almost entirely in the broad base portions thereof. Furthermore, by avoiding the presentation or exposure of ends of the threads, I avoid that damage to the ends of the threads resulting from the false registering with such ends of the threads of the nut, and also avoid the damage to the nut from contact with the exposed ends of threads, which exposed threads become jagged and rough, as is well known.

I claim as my invention and desire to secure by Letters Patent—

1. A bolt having its threaded portion formed with a flat side or sides, the threads on such portion being continuous or intact at their bases, whereby a bearing face or faces will be provided for the locking-key without materially affecting or diminishing the strength of the threads, substantially as and for the purposes specified.

2. As an improved article of manufacture, the bolt herein described, having the head 1, the angular portion 2 next to said head, the unthreaded polygonal portion, and the threaded polygonal portion, the threads of the latter portion being intact and continuous at their bases, whereby a bearing is provided for the nut-locking key without diminishing the strength of the threads, substantially as and for the purposes specified.

3. A bolt consisting of a bar or body having one or more flat sides and provided with a spiral circumferential groove forming threads on the said flattened sides, such groove being unbroken from end to end, forming a continuous unbroken thread, substantially as and for the purposes specified.

4. The combination of a bolt having its threaded portion formed with a flat side or sides, the threads on such portion being continuous or intact at their bases, whereby a bearing face or faces will be provided for the locking-key without materially affecting or diminishing the strength of the threads, the nut turned on the said bolt and having a groove or keyway, $b$, and the key driven in said keyway and bearing on one of the flat sides of the bolt, substantially as and for the purposes specified.

WILEY SWEPSON KEYES.

Witnesses:
W. C. BASKIN,
C. W. TROY.